United States Patent
Clark et al.

(10) Patent No.: US 7,455,548 B2
(45) Date of Patent: Nov. 25, 2008

(54) ROTATABLE CONNECTOR MODULES WITH INVERTED JACKS

(75) Inventors: Gordon P. Clark, Eden Prairie, MN (US); Loren J. Mattson, Richfield, MN (US)

(73) Assignee: ADC Telecommunication, Inc., Eden Prairie, MN (US)

( * ) Notice: Subject to any disclaimer, the term of this patent is extended or adjusted under 35 U.S.C. 154(b) by 0 days.

(21) Appl. No.: 11/583,995

(22) Filed: Oct. 19, 2006

(65) Prior Publication Data

US 2008/0096438 A1     Apr. 24, 2008

(51) Int. Cl.
*H01R 13/60* (2006.01)

(52) U.S. Cl. .................. 439/534; 439/713; 439/404; 439/676; 439/637; 439/247

(58) Field of Classification Search .......... 439/637, 439/247, 538, 534, 713, 404, 676
See application file for complete search history.

(56) References Cited

U.S. PATENT DOCUMENTS

| | | | |
|---|---|---|---|
| 6,504,726 B1 | 1/2003 | Grabinger et al. | |
| 6,537,106 B1 | 3/2003 | Follingstad | |
| 6,608,764 B2 | 8/2003 | Clark et al. | |
| 6,988,914 B2 * | 1/2006 | Pepe et al. | 439/638 |
| 7,070,459 B2 * | 7/2006 | Denovich et al. | 439/719 |
| 7,294,024 B2 | 11/2007 | Hammond, Jr. et al. | |
| 2005/0186838 A1 | 8/2005 | Debenedictis et al. | |
| 2005/0207561 A1 | 9/2005 | Hammond, Jr. | |
| 2005/0221677 A1 | 10/2005 | Hammond et al. | |
| 2007/0238365 A1 | 10/2007 | Hammond, Jr. et al. | |

FOREIGN PATENT DOCUMENTS

| | | |
|---|---|---|
| EP | 1 478 056 A1 | 11/2004 |
| WO | WO 2004/097989 A2 | 11/2004 |
| WO | WO 2006/091850 A1 | 8/2006 |

OTHER PUBLICATIONS

U.S. Appl. No. 11/472,816, filed Jun. 21, 2006.
International Search Report and Written Opinion mailed Aug. 6, 2008.

\* cited by examiner

*Primary Examiner*—Truc T Nguyen
(74) *Attorney, Agent, or Firm*—Merchant & Gould P.C.

(57) ABSTRACT

A telecommunications patch panel includes a frame defining at least one opening configured to receive a connector module; and at least one connector module rotatably mounted in the at least one opening of the frame. Each connector module defines an axis of rotation generally parallel to the front face. Each connector module includes at least a first and second linear array of openings configured to receive jacks modules. Each of the openings in the first linear array is configured to receive a jack module having a first orientation, and each of the openings in the second linear array is configured to receive a jack module having a second orientation. The second orientation is rotated about 180° from the first orientation along an axis of insertion of the jack module.

20 Claims, 14 Drawing Sheets

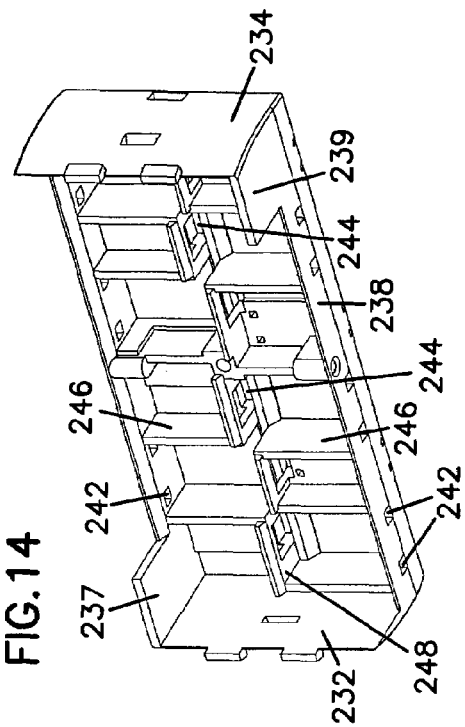
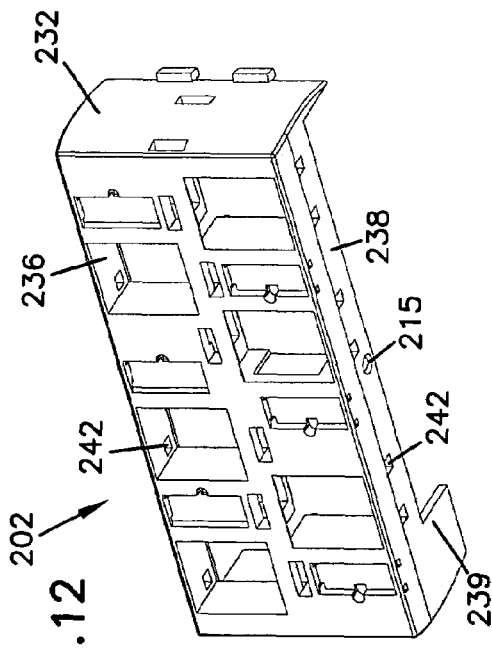

ROTATABLE CONNECTOR MODULES WITH INVERTED JACKS

TECHNICAL FIELD

The present invention relates to a telecommunications connection panel. More particularly, the present invention relates to a telecommunications cross-connection patch panel having rotatably mounted connector modules.

BACKGROUND

Local Area Networks and telecommunications connections often use patch panels, especially at the customer's premises to enable cross-connection between telecommunications equipment. Patch panels typically include front and rear connection locations. The rear connections are typically a more permanent type of connection, such as between an insulation displacement connector, and the copper based, twisted pair telecommunications cable. The front of the patch panel may include any of a variety of jacks, which allows fairly rapid connection and disconnection between two jacks in the same patch panel, or between one jack in the patch panel and another jack in a nearby patch panel, with a patch cord. One type of jack and plug arrangement for a patch panel is an RJ45 type connector. U.S. Pat. No. 5,639,261 concerns a cross-connect panel including rear insulation displacement connectors, and front connector jacks for receiving plugs of patch cords.

There is an increasing need for mitigation of alien cross-talk between connection locations. Therefore, there is a need for patch panels which address the cross-talk concerns noted above.

SUMMARY

One aspect of the present disclosure relates to a telecommunications patch panel including a frame defining at least one opening configured to receive a connector module; and at least one connector module rotatably mounted in the at least one opening of the frame. Each connector module defines an axis of rotation generally parallel to a front face of the connector. Each connector module includes at least a first and second linear array of openings configured to receive jacks modules. Each of the openings in the first linear array is configured to receive a jack module having a first orientation, and each of the openings in the second linear array is configured to receive a jack module having a second orientation. The second orientation is rotated about 180° from the first orientation along an axis of insertion of the jack module.

A variety of examples of desirable product features or methods are set forth in part in the description that follows, and in part will be apparent from the description, or can be learned by practicing various aspects of the disclosure. The aspects of the disclosure can relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 11 is a front, top perspective view of the housing of the connector module of FIG. 9;

FIG. 12 is a front, bottom perspective view of the housing of FIG. 11;

FIG. 13 is a rear, top perspective view of the housing of FIG. 11;

FIG. 14 is a rear, bottom perspective view of the housing of FIG. 11;

DETAILED DESCRIPTION

Reference will now be made in detail to various features of the present disclosure that are illustrated in the accompanying drawings. The present disclosure relates to telecommunications patch panels, and more particularly relates to patch panel assemblies that include connector modules that are pivotally connected to a frame of the assembly. The connector modules include jack ports on one side and wire termination locations on an opposite side. Each connector module is mounted so as to be pivotable relative to the frame. Each module includes a jack geometry that facilitates access to the jacks and reduces cross-talk amongst the jacks.

Figure 1:
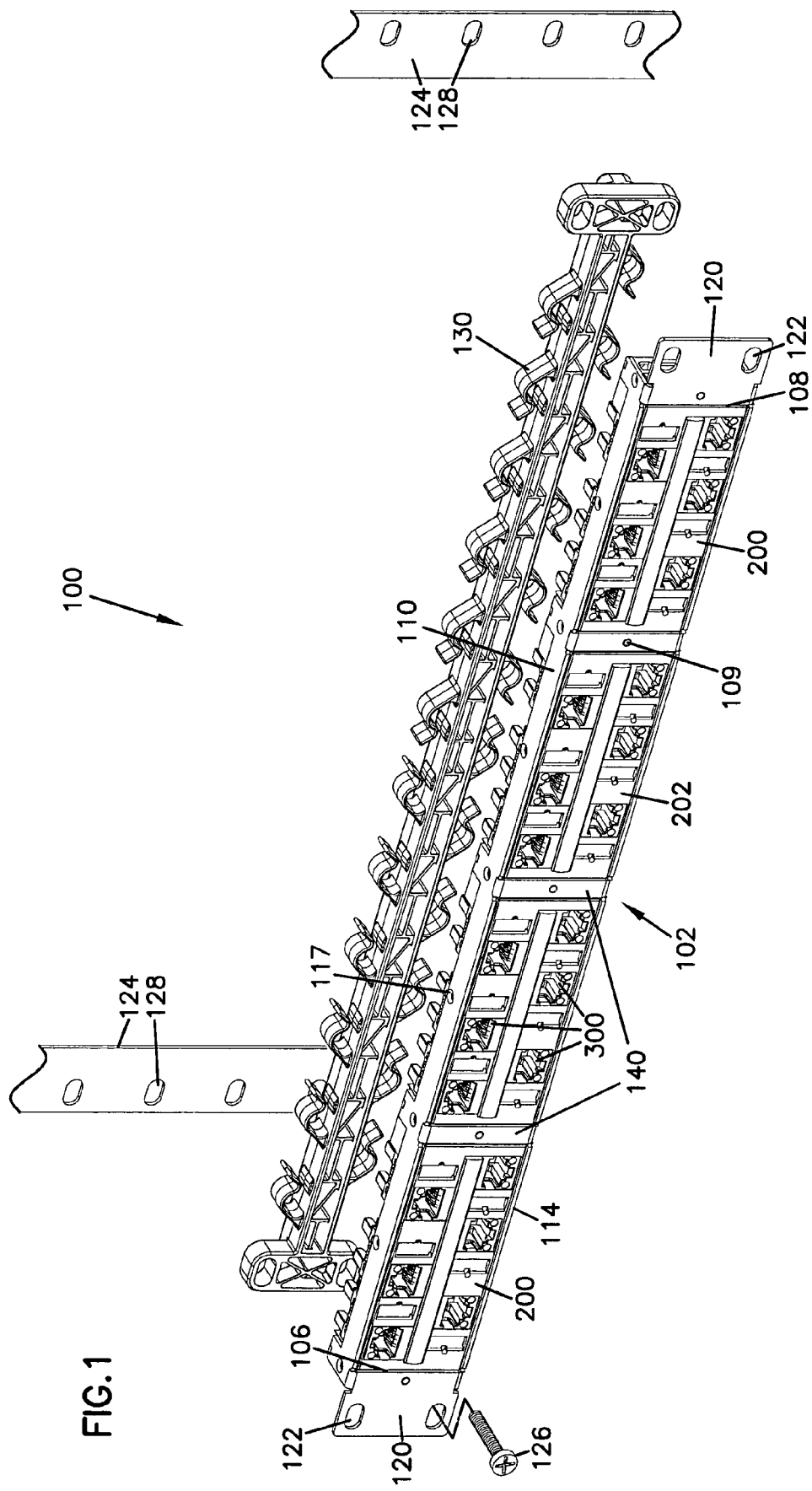
FIG. 1 is a front perspective view of an example patch panel assembly in accordance with the principles of the present disclosure, the assembly including a frame, connector modules rotatably coupled to the frame, and a first example cable manager.
Figure 2:
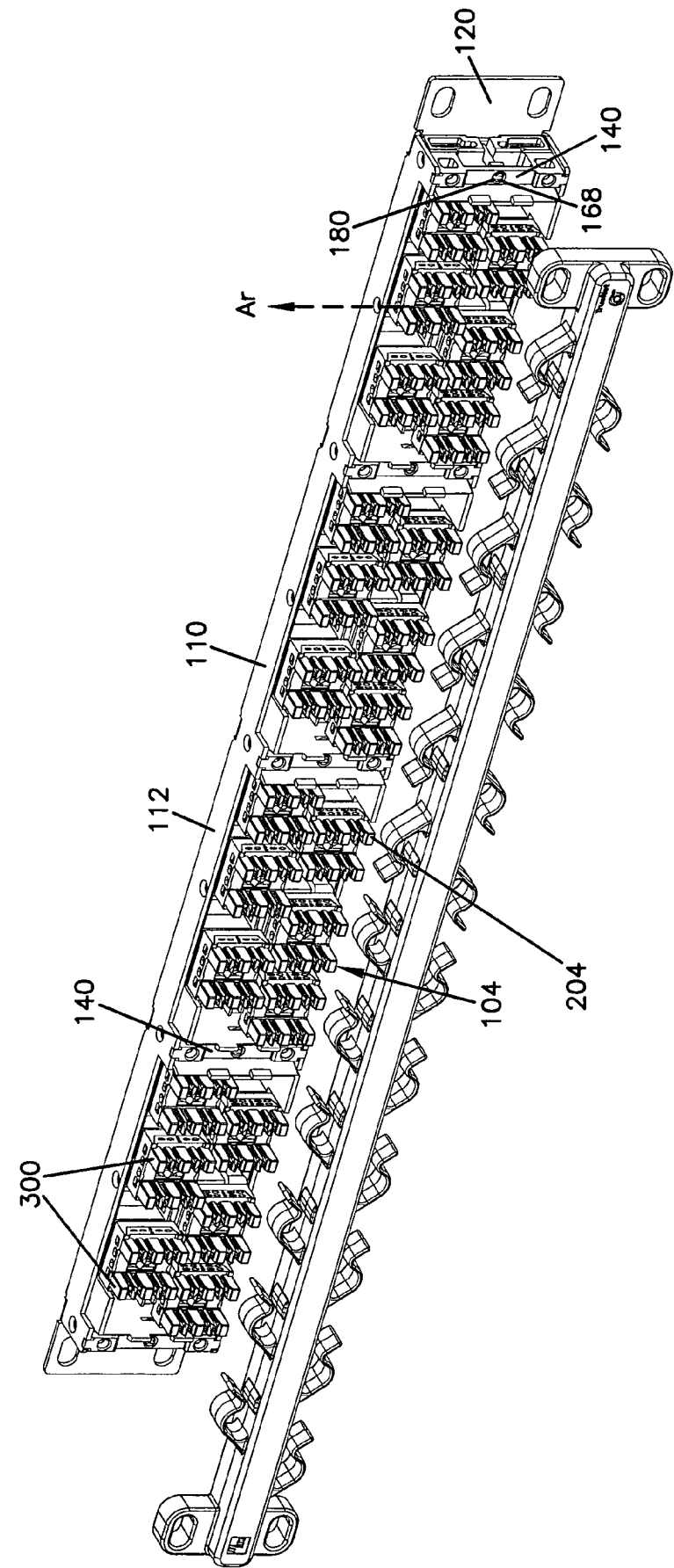
FIG. 2 is a rear perspective view of the patch panel assembly of FIG. 1.
Figure 3:
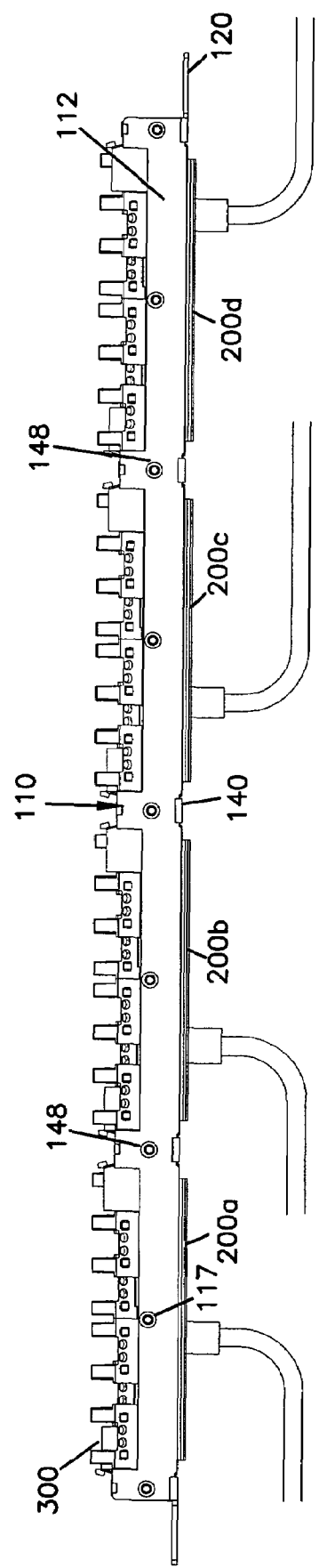
FIG. 3 is a top view of the patch panel assembly of FIG. 1.

Referring now to FIGS. 1-3, an embodiment of a patch panel assembly 100 is shown for use in connecting telecommunications equipment. Patch panel assembly 100 is especially useful to cross-connect equipment through one or more patch panels or other panels. Patch panel assembly 100 includes a frame 110 and a cable manager 130. End brackets 120 extend from a first end 106 to a second end 108 of the frame 110. The end brackets 120 include rack mounting holes 122 for the purpose of mounting the frame 110 to a rack of conventional construction (e.g., partial rack 124 shown in FIG. 1). The patch panel assembly 100 mounts to the rack 124, such as with fasteners 126, passing through holes 122 of the end brackets 120 for receipt in holes 128 of the rack 124.

The frame 110 generally includes a front side 102, a rear side 104, a top portion 112, and an opposing bottom portion 114. One or more connector modules 200 can be mounted to the frame 110 between the top and bottom portions 112, 114. Locks 140 also can extend between the top portion 112 and the bottom portion 114. In certain embodiments, the end brackets 120, locks 140, and the top and bottom portions 112, 114 define a linear array of openings 115 (FIG. 4), each opening 115 being configured to receive one connector module 200.

Figure 4:
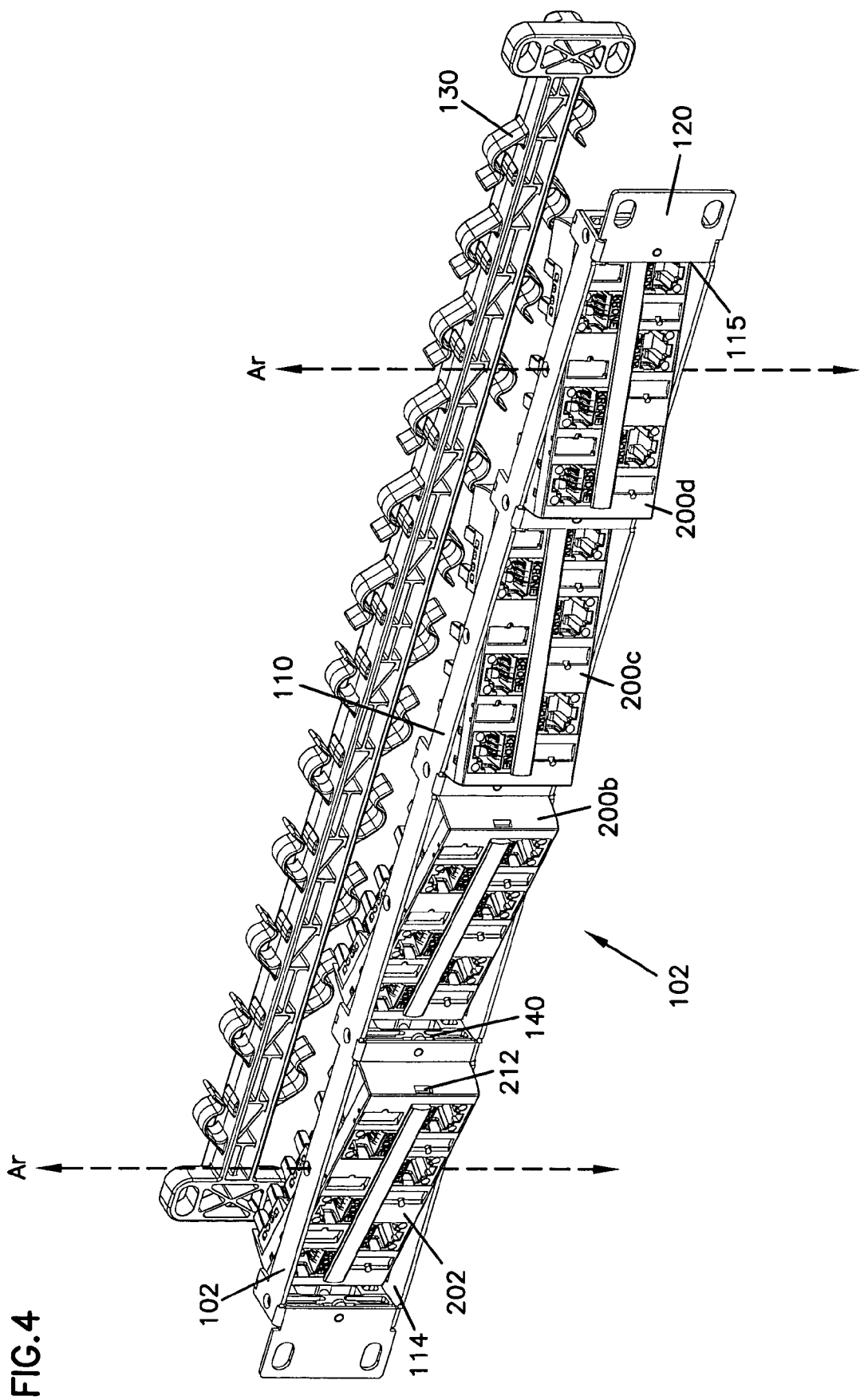
FIG. 4 is a front perspective view of the patch panel assembly of FIG. 1 with the connector modules arranged in angled positions.
Figure 5:
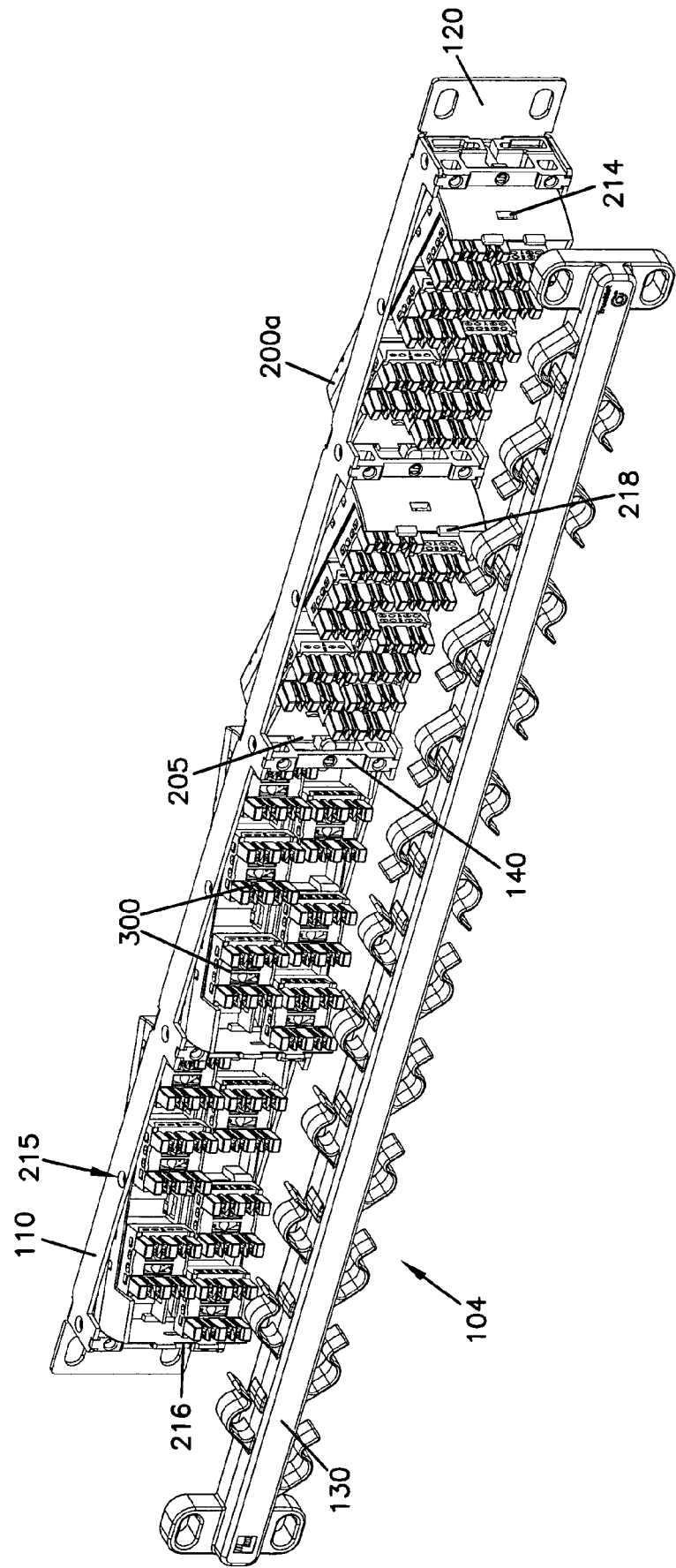
FIG. 5 is a rear perspective view of the patch panel assembly of FIG. 4.
Figure 6:
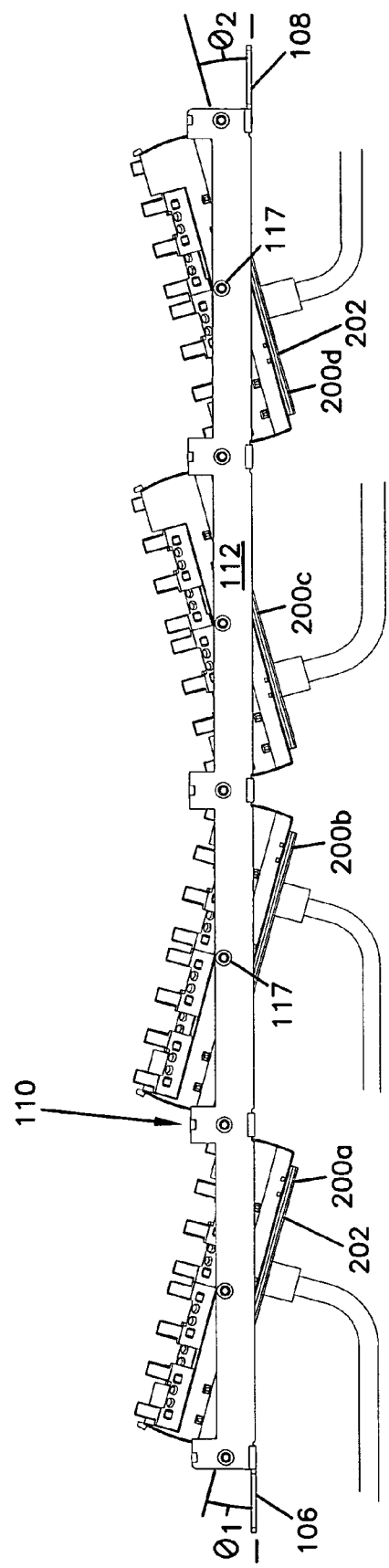
FIG. 6 is a top view of the patch panel assembly of FIG. 4.

Referring to FIGS. 4-6, the connector modules 200 can be rotatably mounted to the frame 110 of the patch panel assembly 100. In general, each connector module 200 is pivotally movable relative to the frame 110 about a generally upright pivot axis $A_R$ that extends between the top and bottom portions 112, 114 of the frame 110. The axis $A_R$ is generally parallel to the front side 102 of the frame 110 and extends transversely relative to the linear arrays of connector modules 200. Each connector module 200 can be rotated into one of multiple positions about the axis $A_R$ (e.g., see FIGS. 3 and 6).

In certain embodiments, each connector module 200 can be rotated to one of three positions. In the first position, a front face 202 of the connector module 200 extends parallel to the front side 102 of the frame 110 (e.g., see FIG. 1). In the second position, the front face 202 of the connector module 200 extends at an angle $\theta_1$ (e.g., see FIG. 6) relative to the front side 102 of the frame 110. In the third position, the front face 202 extends at a second angle $\theta_2$ (e.g., see FIG. 6) relative to the frame 110 where the third position is in a different direction to the second position.

In some embodiments, each of the connector modules 200 can be rotated in a different direction with respect to the others. For example, as shown in FIG. 6, connector modules 200a, 200b are rotated towards a first end 106 of the frame 110, and connector modules 200c, 200d are rotated to a second end 108 of the frame 110. In other embodiments, all of the connector modules 200 can be rotated to face in the same direction. For example, in FIGS. 1-3, each connector module 200 has a front face 202 positioned generally parallel to the front side 102 of the frame 110 and a rear face 204 positioned generally parallel to the rear side 104 of the frame 110.

In a preferred embodiment, the angle of displacement θ of each connector module 200 relative to frame 110 is about ten degrees (10°) to about twenty-five degrees (25°), and more preferably about fifteen degrees (15°). Such an angle can provide strain relief so as to help prevent cable damage and/or loss of cable performance. The cable positioning provided by angling connector modules 200 helps reduce the likelihood of falling below the minimum bend radius of the cable as each cable travels to other jacks or other equipment. Such strain relief is advantageous over a perpendicular mounting of the connector plug relative to the cable pathway.

Figure 9:
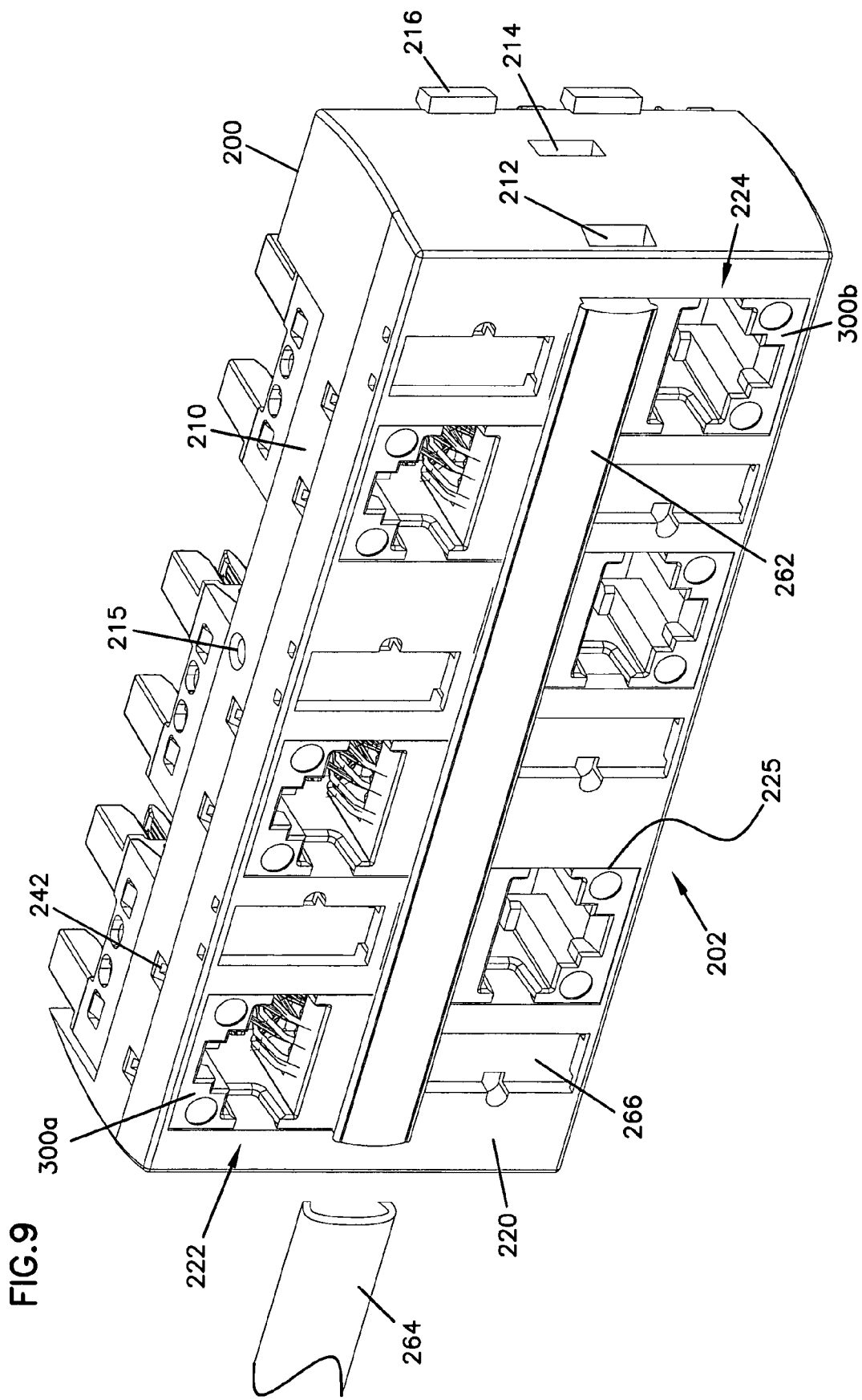
FIG. 9 is a front, perspective view of one of the connector modules of FIG. 1, the connector module including a housing holding six jack modules.

To enable rotational mounting, the top and bottom portions 112, 114 of the frame 110 include holes 117 which align with holes 215 defined in the top and bottom sides of each connector module 200 (e.g., see FIGS. 6 and 9). Pins or other types of fasteners extend through the respective holes 117, 215 to mount the independently rotatable connector modules 200 to the frame 110 and to allow the modules 200 to rotate about respective rotational axes $A_R$.

A lock 140, shown generally in FIGS. 1 and 2, can hold one or two corresponding connector modules 200 at a fixed position with respect to the frame 110. The lock 140 can be disengaged/unlocked from the corresponding modules to allow rotation of the connector modules 200 as desired. To maintain the of the connector modules 200 in one of the rotated positions, the locks 140 are moved into engagement with the corresponding modules 200. In other embodiments, if desired, one or more of the connector modules 200 and frame 110 can be constructed in a permanently angled configuration relative to the front face 102 of the frame 110.

The lock 140 is a preferred feature for patch panel 100. However, a patch panel 100 where the lock 140 remains disengaged and a patch panel 100 where no lock is present are both advantageous arrangements. In those instances, each connector module 200 is positionable to the left (fully or partially), to the right (fully or partially) or parallel as desired. For such connector modules 200 which are freely rotatable, the modules 200 may move to a new position from an original position to provide the strain relief, as patch cords are added or changed.

Figure 7:
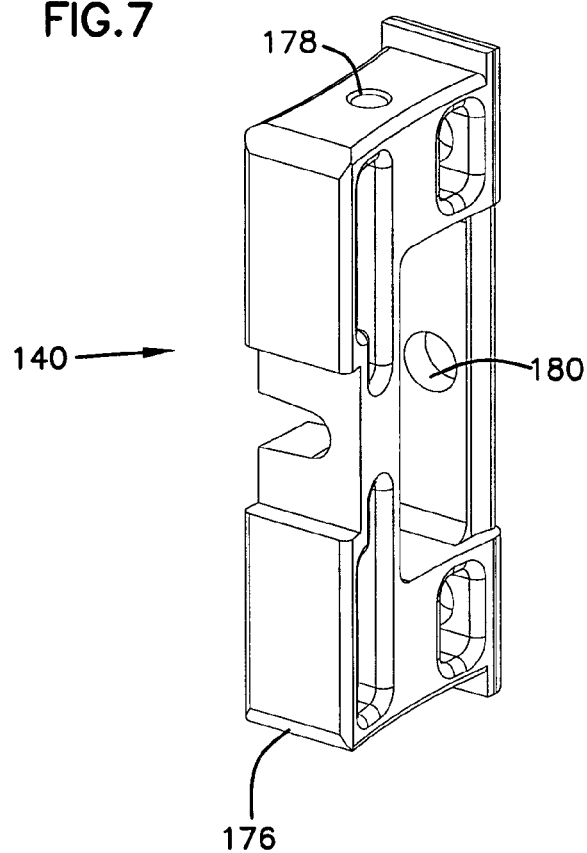
FIG. 7 is a perspective view of a bracket configured to mount to the frame of FIG. 1.
Figure 8:
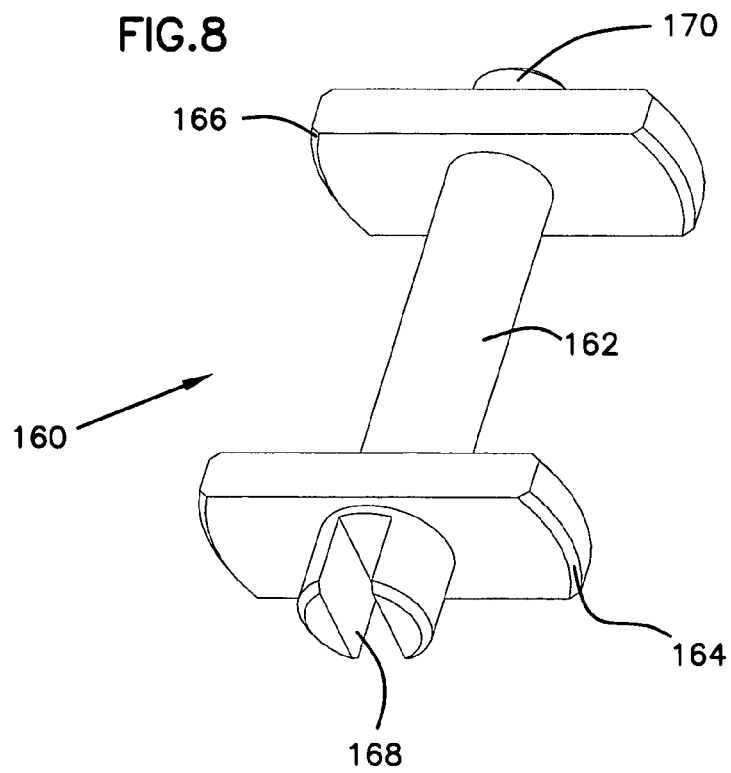
FIG. 8 is a perspective view of a locking pin configured to mount to the bracket of FIG. 7.

Referring to FIGS. 7 and 8, in certain embodiments, each lock 140 includes a bracket 176 and a locking pin 160 mounted to the frame 110 (see FIG. 7). Each bracket 176 is mounted to extend between the top and bottom portions 112, 114 of the frame 110 with fasteners positioned through apertures 148 (see FIG. 3). The fasteners extend through the apertures 148 and are received in holes 178 of the brackets 176. Each locking pin 160 includes a shaft 162, two spaced apart tabs 164, 166, a first tool engageable end 168, and an opposite end 170 (FIG. 8). The shaft is mounted to bracket 176 such that the tool engageable end 168 is received in an aperture 180 of bracket 176 and the opposite end 170 is received in an opening 109 (FIG. 1) defined in the frame 110.

Each tab 164, 166 includes two ends extending in opposite directions. When brackets 176 are mounted to the frame 110, locking pins 160 can be rotated between an unlocked position and a locked position. In the locked position, the tabs extend outwardly from the lock 140 to engage with the adjacent connector module 200. To place the locking pins 160 in the unlocked position, the shaft 162 is rotated ninety degrees (90°) about its longitudinal axis. For example, a flathead screwdriver can be inserted into the tool engageable end 168 of the shaft 162 and twisted to rotate the shaft 162.

As best seen in FIGS. 4 and 5, the locking pins 160 interact with first and second detents 212, 214 (see also FIGS. 9 and 10) defined on both ends 206, 208 (FIG. 10) of each connector module 200 to lock and unlock the connector module 200 relative to the frame 110. When lock 140 is arranged in the unlocked position (i.e., a released state), none of tabs 164, 166 are received in any of the detents 212, 214, thereby allowing free rotation of the connector modules 200. When the locks 140 is arranged in the locked position (i.e., an unreleased state), however, the tabs 164, 166 are rotated ninety degrees (90°) to be received in the detents 212, 214.

For example, when the connector module 200 is locked in a first position parallel with the front 102 of the frame 110, the first tab 164 of each adjacent lock 140 is received in the forward detent 212 and the second tab 166 of each adjacent lock 140 is received in the rearward detent 214. When the connector modules 200 are rotated so that the front sides 202 are not parallel with the front side 102 of the frame 110, however, only one of the tabs 164, 166 of each adjacent lock 140 is received in one of the detents 212, 214.

Each connector module 200 also includes outwardly facing stops 216, 218 (FIGS. 9 and 10) on the ends 206, 208 which limit the amount by which the connector module 200 can be rotated during use. Each stop 216, 218 engages one edge of the bracket 176 (e.g., see FIG. 5) to limit the amount of rotation of the connector module 200 to approximately plus or minus fifteen degrees (15°) in the preferred embodiment.

Further details regarding locking and unlocking connector modules can be found in U.S. Pat. No. 6,537,106, issued Mar. 25, 2003, and entitled "TELECOMMUNICATIONS PATCH PANEL WITH ANGLED CONNECTOR MODULES," the disclosure of which is hereby incorporated by reference.

Figure 10:
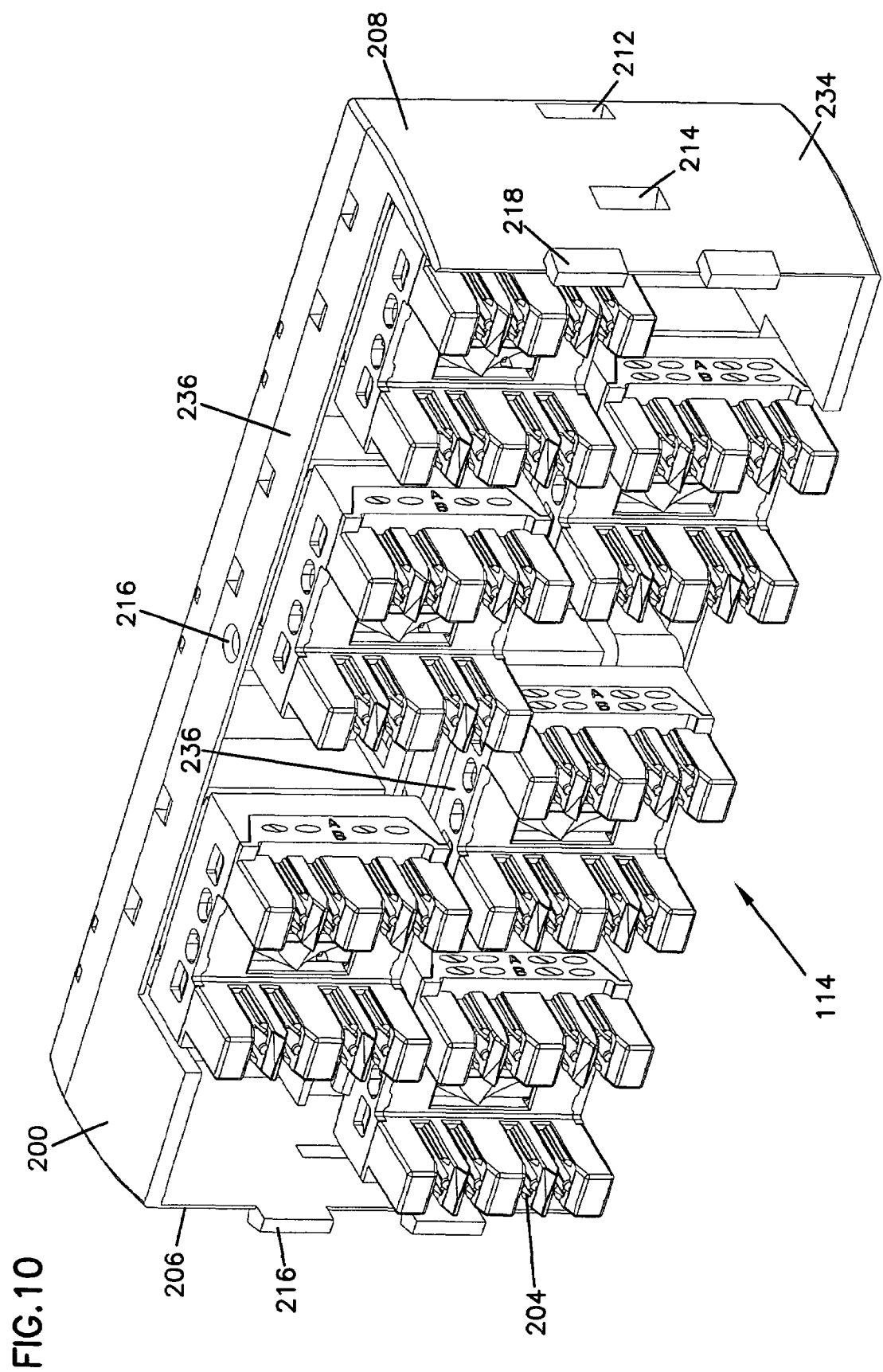
FIG. 10 is a rear, perspective view of the connector module of FIG. 9.
Figure 15:
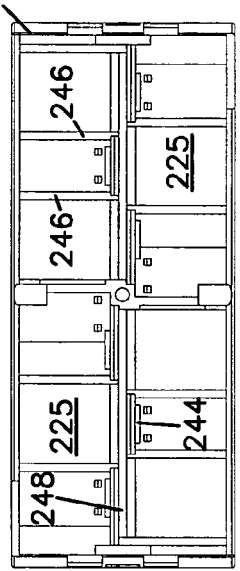
FIG. 15 is a front view of the housing of FIG. 11.
Figure 16:
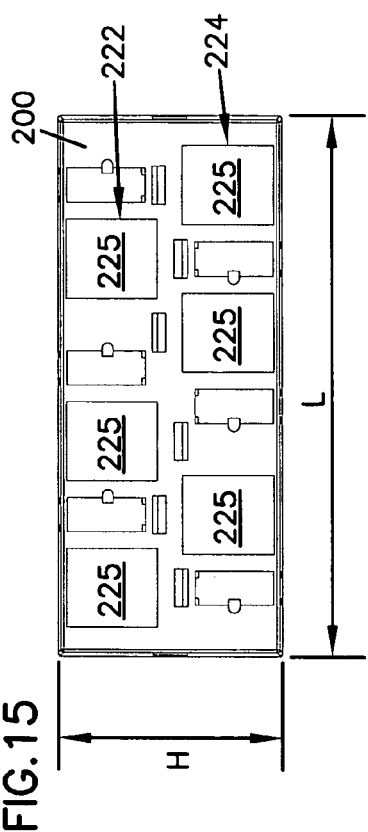
FIG. 16 is a rear view of the housing of FIG. 11.
Figure 17:
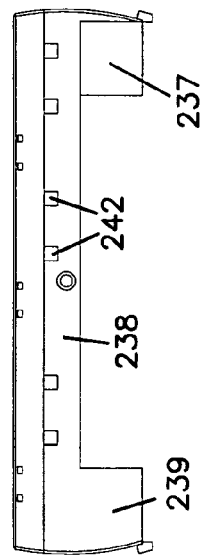
FIG. 17 is a top view of the housing of FIG. 11.

Referring now to FIGS. 9-10, each connector module 200 includes a housing 210. The housing 210 defines an arrangement of openings 225 (FIG. 15) configured to receive jack modules 300, which will be described in greater detail herein with reference to FIGS. 21-25. In the example shown, the housing 210 defines a first linear array (i.e., row) 222 of openings 225 (FIG. 15) and a second linear array 224 of openings 225 (FIG. 15). Generally, the jack modules 300 are positioned in the openings 225 to be flush with the front 202 of the housing 210 and to extend rearwardly from the rear 204 of the housing 210.

Typically, the individual jack modules 300 are spaced apart from each other. In some module arrangements, the jack modules 300 of the first row 222 are offset laterally from the connector jack modules 300 of the second row 224 (i.e., the jack modules 300 in upper and lower rows are not aligned vertically) as shown in FIGS. 9 and 10. In other module arrangements, the jack modules 300 can be positioned directly adjacent to each other rather than being spaced apart. In an alternative module arrangement, the first row 222 of the jack modules 300 is offset in a forward direction from the second row 224 of jack modules 300 (not shown).

Figure 26:
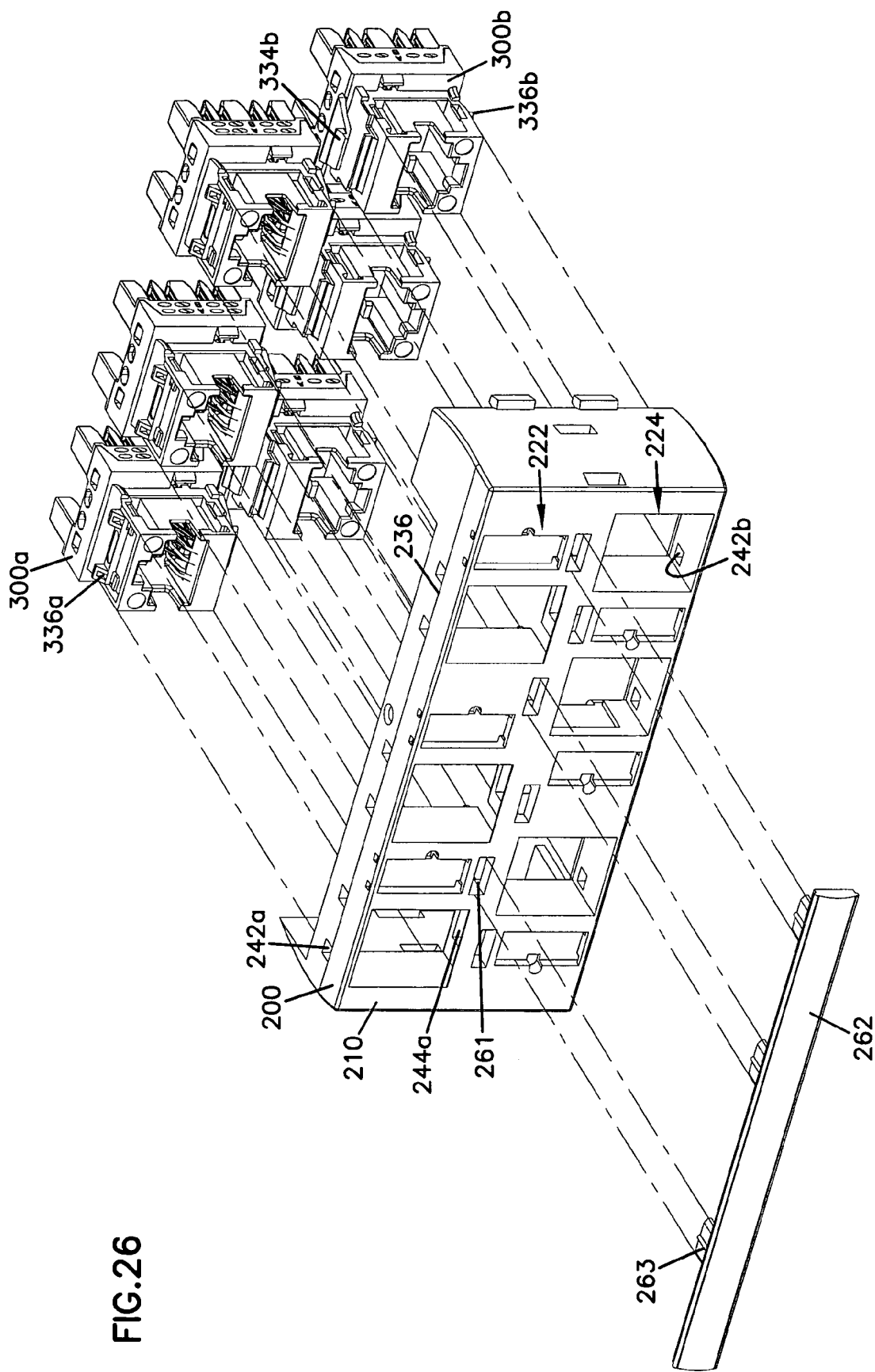
FIG. 26 is an exploded, front perspective view of one of the connector module and jack modules of FIG. 9.

The connector module 200 can also includes indicia members that identify the connector module 200 or the arrangement of the jack modules 300 to a user. For example, the connector modules 200 can include a mounting tab 262 coupled to the front 202 of the connector housing 210. The mounting tab 262 can include protrusions 263 which can be inserted into recesses 261 in the connector housing 210 (FIG. 26). A designation strip can be coupled to the mounting tab 262 by sliding a clear slide window 264 over the mounting tab 262 (FIG. 9). The designation strip allows designation information to be provided adjacent each of the jack modules 300.

The front 202 of the connector housing 210 also can include recessed areas 266 interspaced between the jack modules 300. The recessed areas 266 are configured to receive removable covers (not shown). For example, the covers can be snap-fit, or otherwise affixed to the connector housing 210 over the recessed areas 266. The covers can include a clear material that provides viewing through the covers. Designation labeling can be mounted behind the covers.

Figure 18:
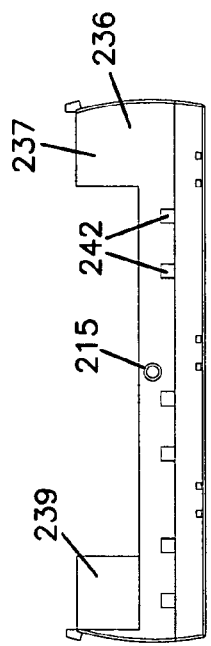
FIG. 18 is a bottom view of the housing of FIG. 11.
Figure 19:
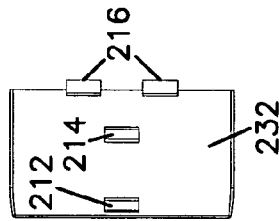
FIG. 19 is a left side view of the housing of FIG. 11.
Figure 20:
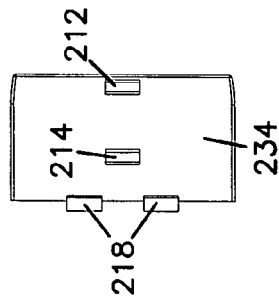
FIG. 20 is a right side view of the housing of FIG. 11.
Figure 21:
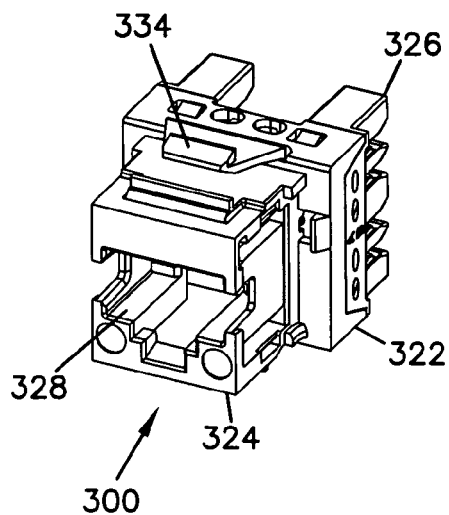
FIG. 21 is a front, top perspective view of one of the jack modules of FIG. 9.

Referring now to FIGS. 11-20, the connector housing 210 includes a faceplate 220 (FIGS. 11 and 15), a right side member 232 (FIGS. 11 and 20), a left side member 234 (FIGS. 14 and 19), a top member 236 (FIGS. 13 and 17), and a bottom member 238 (see FIGS. 14 and 18). The rows 222, 224 of openings 225 configured to receive jack modules 300 generally are defined in the faceplate 220. The holes 215 through which pins or other fasteners coupling the connector module 200 to the frame 110 extend are defined in the top and bottom members 236, 238 (see FIGS. 11 and 12). The detents 212, 214 and stops 216, 218 of each connector module 200 are generally defined by the side members 232, 234 (see FIGS. 19 and 20).

The right side member 232, left side member 234, top member 236, and bottom member 238 extend rearwardly from the faceplate 220 to form the housing 210. In some embodiments, the top and bottom members 236, 238 each include sections 237, 239, respectively, that extend further rearwardly than the remainder of the members 236, 238.

Typically, sections 237 and 239 each extend rearwardly to cover a gap between a jack module 300 and one of the sides 232, 234 (e.g., see FIG. 10).

The top member 236 and the bottom member 238 define alignment slots 242 into which protrusions 336 (FIG. 22) extending outwardly from the jack modules 300 can be inserted to position the jack modules 300 within the housing 210. The interaction between the protrusions 336 and the alignment slots 242 also aids in securing the jack modules 300 to the housing 210.

Support flanges 246 and 248 also extend rearwardly from the faceplate 220 to provide additional support for mounting each of the jack modules 300 (FIGS. 13 and 14). Flanges 246 generally extend vertically to provide support for one or both sides of the jack modules 300. Flanges 248 generally extend horizontally and define latching slots 244, which are configured to receive latches 334 (FIG. 21) of the jack modules 300 to secure the jack modules 300 to the housing 210.

Figure 22:
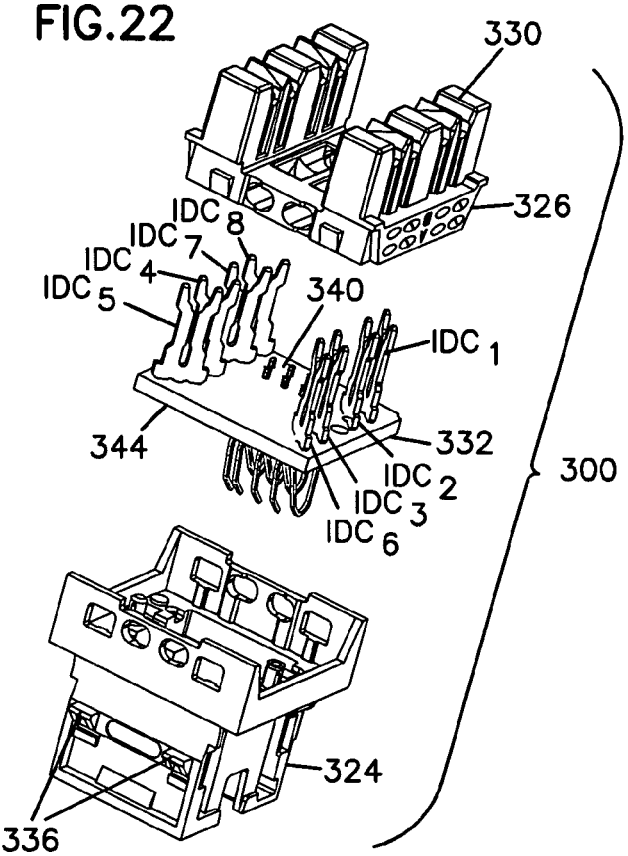
FIG. 22 is an exploded, perspective view of the jack module of FIG. 21 including a circuit board.
Figure 23:
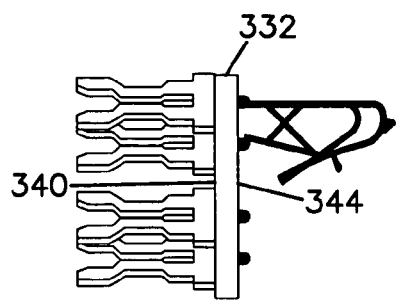
FIG. 23 is a side view of the circuit board of FIG. 22.
Figure 24:
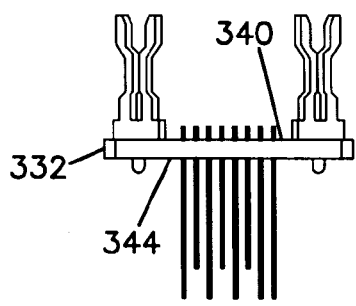
FIG. 24 is a top view of the circuit board of FIG. 22.
Figure 25:
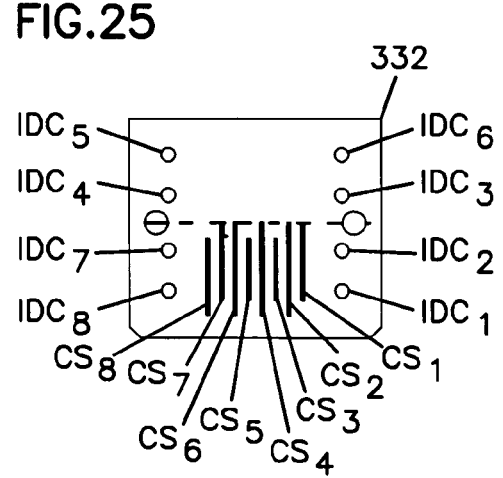
FIG. 25 is a front view of the circuit board of FIG. 22.

Referring now to FIGS. 21-25, each jack module 300 includes a dielectric housing 322 having a front piece 324 and a rear piece 326 (FIG. 22). The front and rear pieces 324, 326 can be interconnected by a snap fit connection. The front piece 324 defines a front port 328 (FIG. 21) sized and shaped to receive a conventional telecommunications plug (e.g., an RJ style plug, such as an RJ 45 plug). The rear piece 326 defines a connector interface. In the example shown, the rear piece 326 includes one or more towers 330 adapted to house insulation displacement connector blades/contacts $IDC_1$-$IDC_8$ (FIG. 22).

Generally, the front port 328 encloses contact springs $CS_1$-$CS_8$ (FIG. 25) that are electrically connected to the insulation displacement connector blades/contacts $IDC_1$-$IDC_8$ to enable transmission of at least one electrical signal therebetween. The jack modules 300 can include a circuit board 332 that mounts between the front and rear pieces 324, 326 of the housing 322.

Contact springs $CS_1$-$CS_8$ (FIG. 25) are terminated to a front side 344 of the circuit board 332. The contact springs $CS_1$-$CS_8$ extend into the front port 328 and are adapted to be electrically connected to corresponding contacts provided on a plug when the plug is inserted into the front port 328. The relative positioning, shape and curvature of the contact springs $CS_1$-$CS_8$ is preferably adapted to provide some initial crosstalk compensation at the jack module 300.

One or more insulation displacement connector blades $IDC_1$-$IDC_8$ are terminated to a back side 340 of the circuit board 332. The insulation displacement connector blades $IDC_1$-$IDC_8$ fit within the towers 330 of the rear piece 326 of the housing 322. The circuit board 332 has tracks (e.g., tracings) that respectively electrically connect the contact springs $CS_1$-$CS_8$ to the insulation displacement connector blades $IDC_1$-$IDC_8$.

In general, the jack modules 300 can be secured to the connector housing 210. For example, each jack module 300 can include a resilient latch tab 334 (see FIG. 21) on a first side and a pair of alignment protrusions 336 (see FIG. 22) on an opposite side. The alignment tabs 336 are configured to fit in the alignment openings 242 of the connector housing 210 and the latch tab 334 is configured to fit within the latch slot 244.

In alternative arrangements, the jack modules 300 can be secured to the connector housing 210 with other connection means such as fasteners and adhesives. Preferably, the jack modules 300 are connected to the connector housing 210 with a releasable connection. Further details regarding the jack module 300 can be found in U.S. application Ser. No.

11/472816, filed Jun. 22, 2006, and titled "TELECOMMUNICATIONS PATCH," the disclosure of which is hereby incorporated by reference.

Figure 27:
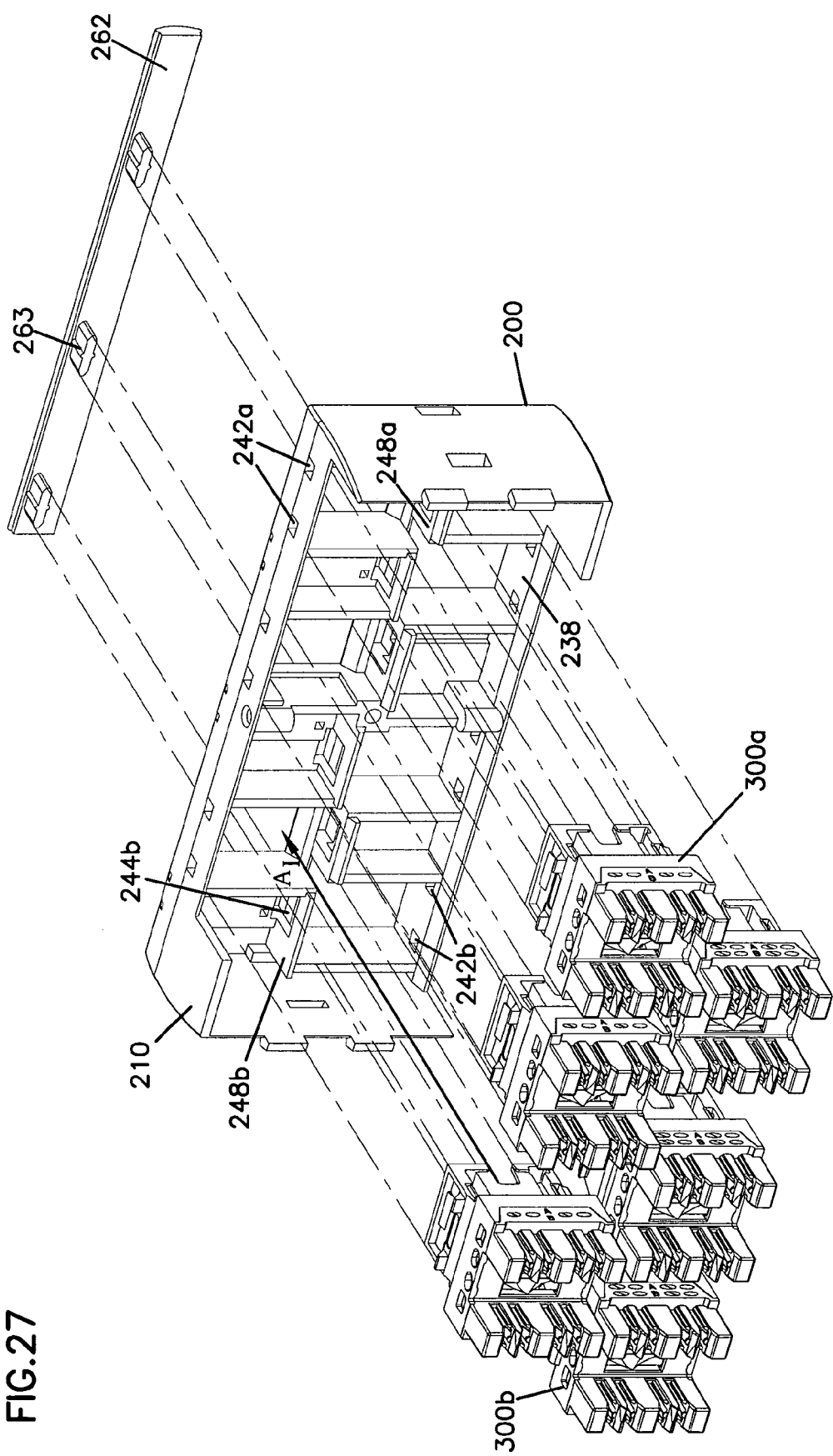
FIG. 27 is an exploded, rear perspective view of the connector module and jack modules of FIG. 26.

Referring to FIGS. 26 and 27, the jack modules 300 are generally mounted within the openings 225 of the connector housing 210 from the rear 204 of the module 200 along an insertion axis $A_I$ (FIG. 27). The jack modules 300 typically snap fit onto the housing 210 by first inserting the protrusions 336 of the jack 300 into the alignment openings 242 from the rear side 204 of the connector housing 210, and then rotating the jack module 300 until the latch tab 334 locks within the latching slot 244 of the housing 210.

In certain embodiments, jack modules 300 are received in the first row 222 of openings 225 in a first orientation and additional jack modules 300 are received in the second row 224 of openings 225 in a second orientation. For example, as shown, the jack modules 300 in the second row 224 can be rotated 180° about their respective insertion axes $A_I$ (FIG. 27) relative to the jack modules 300 of the first row 222. The insertion axis $A_I$ of each jack module 300 defines the path along which the jack module 300 is inserted into the connector module 210. Inserting the jack modules 300 of one row at a different orientation from the other row improves spacing between the connectors and reduces cross-talk amongst the connectors of the modules 300.

For example, as shown in FIG. 26, a first jack module 300a has a first orientation about its respective insertion axis $A_I$. The first jack module 300a includes protrusions 336a that can be inserted into alignment slots 242a defined in the top member 236 of the housing 210. A latch tab (not shown) on the opposite side of the jack module 300a is configured to engage with latch slot 244a defined in flange 248a (FIG. 27).

A second jack module 300b, however, has a second orientation rotated about 180° from the first orientation of the first jack module 300a. The second jack module 300b includes protrusions 336b (FIG. 26) that can be inserted into alignment tabs 242b (FIG. 27) defined in the bottom member 238 of the housing 210. The second jack module 300b also includes a latch tab 334b (FIG. 26) that can be engaged with a latch slot 244b (FIG. 27) defined in flange 248b of the housing 210.

In use, wires can be electrically connected to RJ plugs inserted in the front ports 328 of the jack modules 300 by inserting the wires between pairs of the insulation displacement connector blades $IDC_1$-$IDC_8$ at the rear of the jack modules 300. When the wires are inserted between pairs of the insulation displacement connector blades $IDC_1$-$IDC_8$, the blades cut through the insulation of the wires and make electrical contact with the center conductors of the wires. In this way, the insulation displacement connector blades $IDC_1$-$IDC_8$, which are electrically connected to the contact springs $CS_1$-$CS_8$ by the tracks on the circuit board, provide an efficient means for electrically connecting a twisted pair of wires to the contact springs $CS_1$-$CS_8$ of the jack modules 300.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A telecommunications patch panel comprising:
a frame having a top portion, a bottom portion, a front side, and a rear side, the frame defining at least one opening configured to receive a connector module; and
at least one connector module rotatably mounted in the at least one opening of the frame, each connector module having a front face extending between a top end, a bottom end, a first side, and a second side, each connector module defining an axis of rotation extending between the top and bottom portions of the frame and generally parallel to the front face of the connector module, the front face of each connector module including at least a first and a second linear array of openings configured to receive jacks modules, each of the openings in the first linear array being configured to receive a jack module having a first orientation, and each of the openings in the second linear array being configured to receive a jack module having a second orientation, wherein the second orientation is rotated about 180° from the first orientation along an axis of insertion of the jack module,
wherein the connector module includes a first row of spaced support flanges and a second row of spaced support flanges, the spaced support flanges of the first and second rows being arranged between the first and second linear array of openings and extending from the front face of the connector module toward the rear side of the frame, each support flange defining a latching tab configured to receive a latch of one of the jack modules received in one of the openings of the first and second linear arrays.

2. The telecommunications patch panel of claim 1, further comprising at least one jack module mounted to the at least one connector module, the at least one jack module including a front piece electrically coupled to a rear piece for transmission of telecommunications signals therebetween.

3. The telecommunications patch panel of claim 2, wherein the front piece of the at least one jack module includes a port for receiving a plug.

4. The telecommunications patch panel of claim 3, wherein the port includes an RJ45 jack.

5. The telecommunications patch panel of claim 2, wherein the rear piece of the at least one jack module includes at least one insulation displacement connector.

6. The telecommunications patch panel of claim 2, wherein the front piece of each jack module includes one port, and wherein the rear piece of each jack module includes a plurality of insulation displacement connectors.

7. The telecommunications patch panel of claim 1, wherein the axis of rotation generally extends upright between upper and lower portions of the frame.

8. The telecommunications patch panel of claim 1, further comprising at least one releaseable lock engageable with the at least one connector module, wherein the connector module is rotatable when the lock is in a released state, and wherein the connector module is immobilized when each lock is in an unreleased state.

9. The telecommunications patch panel of claim 8, wherein the lock is configured to selectively retain the connector modules to the frame in one of three selectable positions.

10. The telecommunications patch panel of claim 1, wherein each of the connector modules is rotatable from a first position where a front face of the connector module is generally parallel to the front side of the frame, to a second position in a first direction relative to the first position, or to a third position in a second direction relative to the first position, the second direction being different the first direction.

11. The telecommunications patch panel of claim 10, wherein the second direction is angled at about fifteen degrees from the first position.

12. The telecommunications patch panel of claim 1, further comprising brackets extending from the frame for mounting to a rack.

13. The telecommunications patch panel of claim 1, wherein a plurality of jack modules are mounted in the openings of the first and second linear arrays, each jack modules spaced from the other jack modules within each linear array.

14. A telecommunications patch panel comprising:

a plurality of jack modules, each jack module including a front port configured to receive a plug and at least one rear insulation displacement connector electrically coupled to the front port, each jack module also including a resilient latch tab protruding from a first side of the jack module and at least one alignment protrusion extending from an opposite side of the jack module; and a plurality of connector modules, each connector module including a housing having a front face and an opposite facing rear face extending between a top member and a bottom member, the housing defining a first plurality of openings and a second plurality of openings extending from the front face to the rear face, each of the first and second plurality of openings configured to receive a jack module, the top member defining alignment slots configured to receive the alignment protrusions of jack modules received in the openings of the first plurality, the bottom member defining alignment slots configured to receive the alignment protrusions of jack modules received in the openings of the second plurality, each connector module housing defining an axis of rotation extending generally parallel to the front face of the connector module, the first and second plurality of openings extending generally perpendicular to the respective axes of rotation of the connector modules.

15. The telecommunications patch panel of claim 14, wherein the housing further includes at least one flange extending rearwardly from the front face of the housing, the at least one flange defining a latch slot for receiving a latch tab of one of the jack modules.

16. The telecommunications patch panel of claim 14, further comprising:

a frame defining a linear array of openings, each of the plurality of connector modules being mounted to the frame in one of the openings of the linear array for rotatable movement about the respective rotation axes of the connector modules.

17. The telecommunications patch panel of claim 16, wherein each of the connector modules is positionable in at least one of the group consisting of: a first position in which the front face of the connector module is generally parallel to the front side of the frame, a first angled position in which the front face of the connector module is at a first angle relative to the front side of the frame, and a second angled position in which the front face of the connector module is at a second angle relative to the front side of the frame, the first angled position being in a first direction from the first position, the second angled position being in a second direction from the first position, the second direction being different from the first direction.

18. A method for assembling a telecommunications patch panel comprising:

providing a frame including a plurality of rotatably mounted connector modules, each connector module including a front face extending from a top member to a bottom member, the front face defining a first linear array of openings and a second linear array of openings;

mounting a first jack module to an opening in the first linear array of a selected one of the connector modules by inserting an alignment protrusion of the first jack module into an alignment slot defined by the top member of the selected one of the connector modules, and rotating the first jack module until at least one latch tab of the first jack module locks within a latch tab opening defined in a first flange extending rearwardly from the connector module intermediate the top member and the bottom member;

mounting a second jack module to an opening in the second linear array of the selected connector module by inserting an alignment protrusion of the second jack module into an alignment slot defined by the bottom member of the selected one of the connector modules, and rotating the second jack module until at least one latch tab of the second jack module locks within a latch tab opening defined in a second flange extending rearwardly from the connector module intermediate the top member and the bottom member.

19. The method of claim 18, further comprising:

unlocking the selected connector module from a locked condition relative to the frame;

rotating the selected connector module relative to the frame to a rotated position about an axis of rotation of the selected connector module; and relocking the selected connector module in the rotated position relative to the frame so that insertion axes of the first and second jack modules are locked at a non-perpendicular angle relative to the frame, and so that each of the first and second jack modules can be accessed by plugs.

20. The method of claim 19, wherein rotating the selected connector module includes rotating the selected connector module about fifteen degrees relative to the frame.

\* \* \* \* \*